United States Patent

[11] 3,576,301

| [72] | Inventor | Joseph W. Stickle<br>Hampton, Va. |
|------|----------|-----------------------------------|
| [21] | Appl. No. | 835,060 |
| [22] | Filed | June 20, 1969 |
| [45] | Patented | Apr. 27, 1971 |
| [73] | Assignee | the United States of America as represented by the Administrator of the National Aeronautics and Space Administration |

[54] DIRECT LIFT CONTROL SYSTEM
10 Claims, 7 Drawing Figs.

[52] U.S. Cl. ............................................. 244/42
[51] Int. Cl. ............................................. B64c 21/08
[50] Field of Search ................................ 244/42,
42.4, 42.45, 42.41, 42.48, 42.6, 42.61, 42.62, 43,
130

[56] References Cited
UNITED STATES PATENTS

| 2,891,740 | 6/1959 | Campbell | 244/42(X) |
| 3,232,563 | 2/1966 | Langfelder | 244/42 |
| 3,447,763 | 6/1969 | Allcock | 244/42(X) |

Primary Examiner—Milton Buchler
Assistant Examiner—Carl A. Rutledge
Attorneys—Howard J. Osborn and G. T. McCoy ABSTRACT: A lift surface for an aircraft. The lift surface having flaps. Slots formed through the flaps adjacent their leading edge. Closure mechanism for varying the size of the slots to regulate the degree of spoiling of the flap induced lift and the resultant direct lift control.

PATENTED APR 27 1971

3,576,301

INVENTOR.
JOSEPH W. STICKLE

BY

ATTORNEYS 3,576,301

DIRECT LIFT CONTROL SYSTEM

ORIGIN OF INVENTION

The invention described herein was made by an employee of the United States Government and may be manufactured and used by or for the Government for governmental purpose without the payment of any royalties thereon or therefor.

BACKGROUND OF THE INVENTION

Various direct lift control systems have been utilized rather extensively in the past; however, their use has been limited primarily to heavy commercial or military-type aircraft. Most of the prior art direct lift control devices consist of rapidly actuated variable flaps or spoilers. These systems require considerable energy for actuation usually by an electrical or hydraulic system or a combination of both. Such sophisticated systems are seldom, if ever, found on light aircraft due to the expense involved. Not only are powerful drive systems necessary to actuate prior art systems, but satisfactory results are not always obtained even when the system is utilized. This is true, because relatively large drag changes accompany the variations due to changes in airfoil shape. Thus, it is apparent that existing direct lift control systems leave much to be desired when applied to large aircraft which have sufficient power and mechanism to operate the system, and are of no value at all to small aircraft because of the cost and weight of such a complicated system.

SUMMARY OF THE INVENTION

The present invention is believed to overcome the difficulties of the prior art by providing a direct lift control system which is associated with existing control mechanism on most all aircraft. This is accomplished by forming a slot through the flap associated with the wing. When the flap is deflected, air is forced through the slot opening in the lower surface of the flap and discharged at the slot opening at the upper surface of the flap and spoils the airflow over the flap thus reducing lift. Tests have shown that this arrangement has little effect on drag, since the actual shape of the airfoil flap combination has not been changed to any degree. There are, in addition, various means with which to control the slot width that will require only small forces for operation. Thus, it is believed that the objects of the invention have been fulfilled by such an arrangement, the objects being to provide a direct lift control which may be utilized on all aircraft, but particularly has application to lightweight aircraft.

DESCRIPTION OF THE PREFERRED EMBODIMENTS

Figure 1:
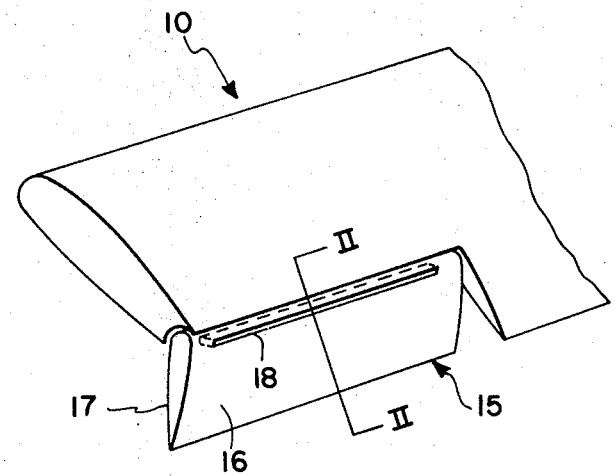
FIG. 1 is a perspective view of a typical wing airfoil section and its flap showing the position of the slot in the flap.

An aircraft airfoil in the nature of a wing section is shown in FIG. 1 and designated generally by the reference numeral 10. The flap, generally 15, is associated with the trailing edge of the wing section 10 in the usual manner. A portion of the railing edge section of the wing is cut out and the flap 15 hinged to the wing section. The particular manner of hinging is not shown since it is believed that such techniques are well known in the prior art.

Figure 2:
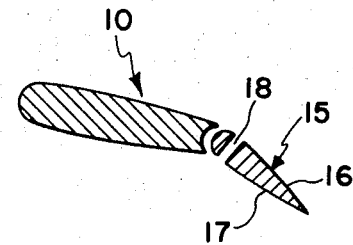
FIG. 2 is a cross section taken along the section lines II–II of FIG. 1.

The flap 15 has an upper surface 16 and a lower surface 17. The leading edge of the flap has substantial thickness and the trailing edge tapers off to a point in the usual airfoil design. Positioned adjacent the leading edge of the flap is a slot 18 which is formed in the flap providing a passage between the lower surface 17 and the upper surface 16. As shown in FIG. 2, the flap 15 when deflected presents an opening (the slot 18) to the airstream which will force ram air through the flap and discharge it at the upper surface 16 spoiling the flow over the surface and thus reducing lift.

Figure 3:
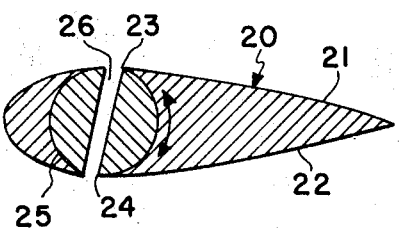
FIG. 3 is a cross-sectional view of a flap showing a rotating cylinder arrangement for varying the flow through the flap slot.

The invention is a direct lift control device, used primarily for control augmentation on landing or possibly turning the aircraft. Thus, much of the aircraft flying time is spent without the necessity of the direct lift control system and it is desirable to not have the system otherwise interfere with the flight. FIG. 3 shows a cross-sectional view of a flap and mechanism associated with the flap which will enable the pilot to operate the system at will. The flap of FIG. 3 is designated generally by the reference numeral 20 and has an upper surface 21 and lower surface 22. An upper slot opening 23 and lower slot opening 24 are formed in the flap. A cylinder 25 with a slot 26 extending diametrically therethrough is rotatably mounted in the flap. As is shown in FIG. 3, the slot 26 in the cylinder 25 registers with the slot openings 23 and 24 providing a passage through the flap which is approximately equal to the slot openings 23 and 24. It is believed apparent, however, that upon rotation of the cylinder 25 that a portion of the slot may be blocked off or the openings 23 and 24 closed completely.

Figure 7:
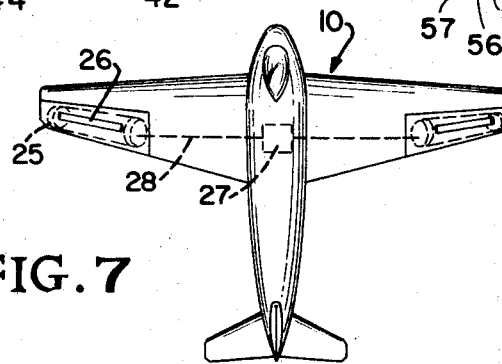
FIG. 7 is a plan view of a schematic, showing a system for operating the flap slot closure members.

A mechanism for rotating the cylinder 25 is shown schematically in FIG. 7, and may be constituted from mechanism known in the art. For example, a segment of the cylinder may be provided with teeth which engage with teeth on a sprocket which is attached to a small reversible electrical motor. Obviously, a sprocket could be fixed to the end of the cylinder 25 and a chain engage the sprocket and the sprocket on a small reversible drive motor to rotate the cylinder. A pure mechanical drive from the pilots control column to the rotating bar is also feasible. The above-mentioned mechanism can be actuated conventionally by electrical circuitry or hydraulic components shown diagrammatically by the box and lines designated by reference numerals 27 and 28. The control 27 may be used to move the slot closure mechanism symmetrically or asymmetrically.

Figure 4:
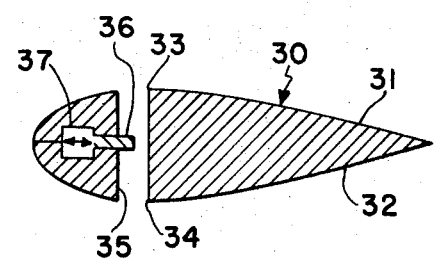
FIG. 4 is a cross-sectional view of a modified flap showing a closure member and actuator for varying the flow through the slot.

FIG. 4 shows another flap arrangement and associated closure mechanism for varying the size of the flap slot. The flap is designated generally by the reference numeral 30 and has an upper and lower surface 31 and 32 respectively. Slot openings 33 and 34 are formed in the upper and lower surface respectively of the flap and provide an entrance to the slot 35 which is formed through the flap. Located centrally within the flap 30 is a seal 36 which is movable to block some portion or all of the flow through slot 35. The seal 36 may be constructed from various materials such as hard rubber, neoprene or metal and provide an effective seal. The seal member 36 is connected to the movable member of an actuator 37. The actuator 37 is of a conventional design and could be one of the various pneumatic or hydraulic actuators utilized to move a mechanical device.

Figure 5:
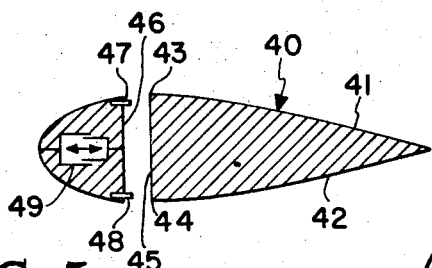
FIG. 5 is a cross-sectional view of another modification showing a flap having a closure member and actuator wherein closure takes place at both the top and bottom surfaces of the flap.

Another slot closure arrangement is shown in the flap of FIG. 5 designated generally by the reference numeral 40. The flap 40 has an upper surface 41 and a lower surface 42, slot openings 43 and 44 provide an entrance to the slot 45 which is formed through the flap 40. In the FIG. 5 embodiment an upper seal 47 and lower seal 48 are provided. These seals are connected to a T-bar frame 46 which is in turn fixed to the movable element of an actuator 49. The seals 47 and 48 slide across the slot 45 to partially or completely close the slot thereby regulating the flow through the slot.

Figure 6:
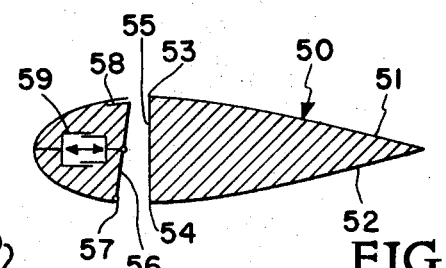
FIG. 6 shows a modification wherein the size of the slot in the slot is varied by a pivoted gate arrangement.

Another technique is shown in the flap of FIG. 6 for regulating flow through a flap slot. The flap 50 has an upper surface 51 and lower surface 52. Slot openings 53 and 54 are located respectively in the upper and lower surfaces of the flap and provide an entrance and exit to the slot 55 formed through the flap. A gate 56 is pivotally connected at 57 to the lower surface 52 of the flap. The movable element of actuator 59 is connected at approximately the midpoint of gate 56 and provides an arrangement for moving the gate to partially or completely close the slot 55. A sealing element 58 is associated with the gate 56 and provides a means for positively sealing off flow when in contact with the slot wall 55.

It is believed clear that any of the closure arrangements shown in FIGS. 3—6 or possibly some combination of the closure devices might be utilized to restrict flow through the slot in the flaps. It should be apparent from the drawings that the upper slot openings are exit openings and located so as to be almost perpendicular to the upper surfaces of the various flaps. In operation, as the airfoil generates lift, there will be a lower pressure at the upper surface than at the lower surface, this differential resulting in the flow through the slot tending to equalize the pressures. Thus, at lower angles of attack with very narrow slot openings, the slot flow will normally remain in the boundary layer and little if any lift loss will result. However, as the angle of attack increases, or as the flap is deflected to a greater degree, slot flow will penetrate the boundary layer to separate the flow aft of the slot reducing lift with a resultant direct lift control.

In actual flight operation, simultaneous increasing or decreasing of the slot size in both of the flaps will result in direct lift control on the longitudinal flight aspects of the aircraft. Direct lift control of this type would normally be utilized to assist the pilot in landing the aircraft. It should also be recognized however, that the closure members may be actuated asymmetrically in flight wherein the slot in one flap might remain closed and the other one opened or vice versa and lateral control for the aircraft be provided.

What is claimed as new and desired to be secured by Letters Patent of the United States is:

I claim:

1. A direct lift control for an aircraft comprising:
   an aircraft;
   said aircraft having airfoils including wings;
   flaps forming a part of said wing airfoils;
   slots formed through said flaps in the spanwise direction thereof;
   means for lowering said flaps into an airstream which is forced into openings of the slots in the lower surface of the flaps and discharged at openings of the slots on the upper surface of the flaps; and
   closure means located in the flaps associated with the slots to vary their size controlling the flow therethrough to spoil a portion of the lift capability of the airfoils.

2. A direct lift control for an aircraft as in claim 1 wherein symmetrical movement of said closure means provides longitudinal direct lift control.

3. A direct lift control for an aircraft as in claim 1 wherein asymmetrical movement of said closure means increasing the size of the slot in one flap and decreasing the size of the slot in the other flap provides lateral direct lift control.

4. A direct lift control for an aircraft as in claim 1 wherein said slots exits substantially perpendicular to the upper surface of the flaps.

5. A direct lift control for an aircraft as in claim 1 wherein said closure means is a rotatable cylinder; slots formed through said cylinder regulating the amount of flow through said slots.

6. A direct lift control for an aircraft as in claim 1 wherein said closure means is seals; actuator means connected to said seals for movement to open and close said flap slots thereby regulating the amount of flow through said slots.

7. A direct lift control for an aircraft as in claim 1 wherein said closure means is seals; said seals being located adjacent the upper and lower surfaces of said flaps; and actuator means connected to said seals for movement to open and close said flap slots thereby regulating the amount of flow through said slots.

8. A direct lift control for an aircraft as in claim 1 wherein said closure means are gates; said gates being pivotally mounted to said flaps adjacent said slots; and actuator means connected to said gates for movement to open and close said flap slots thereby regulating the amount of flow through said slots.

9. A direct lift control for an aircraft as in claim 1 wherein said slots are placed adjacent the leading edges of the flaps.

10. A direct lift control for an aircraft as in claim 1 wherein said slots extend throughout substantially the entire length of the flaps.